UNITED STATES PATENT OFFICE.

HENRY FROEHLING, OF BALTIMORE, MARYLAND, ASSIGNOR OF ONE-HALF TO CHARLES C. EDGERTON, OF SAME PLACE.

INDELIBLE INK.

SPECIFICATION forming part of Letters Patent No. 243,441, dated June 28, 1881.

Application filed May 13, 1881. (No specimens.)

*To all whom it may concern:*

Be it known that I, HENRY FROEHLING, a citizen of the United States, residing at Baltimore, in the county of Baltimore and State of Maryland, have invented certain new and useful Improvements in Indelible Inks; and I do hereby declare the following to be a full, clear, and exact description of the invention, such as will enable others skilled in the art to which it appertains to make and use the same.

The present invention relates to compositions for use as writing or canceling inks, and its object is to produce an ink which shall be indelible and indestructible, whether used with a stamping device or with the pen, and shall, in the latter case, flow smoothly and freely, and not be liable to cause a precipitation or settling of the carbon.

It has heretofore been proposed to dissolve the carbon or pigment of an ink in an alkaline solution for the purpose of holding said carbon in a state of suspension, and causing the same to permeate the paper in a more effective manner, as the alkali possesses the property of oxidizing or weakening the surface of the paper.

Inks of the above description are known as "alkaline inks," and are set forth, for example, in the English patent of Stephens and Nash, No. 7,342, granted in the year 1838.

My invention also involves the use of an alkaline solution for thoroughly holding the carbon or pigment of an ink in a soluble state; but instead of using pigment alone, or combining it with a resinous or gelatinous substance, as in the above-mentioned English patent, I use asphaltum and a carbon having its oleaginous or volatile constituents removed by calcination.

In preparing my ink I proceed as follows, viz: To a boiling saturated solution of caustic potash or soda I add asphaltum—preferably Trinidad asphaltum—until the boiling solution is saturated therewith, and to this solution I add sufficient lamp-black, or other pure and finely-divided carbon, to bring the mass to the consistency of a paste.

The lamp-black or carbon used in the preparation of my ink is calcined previous to its admixture with the other substances, or is heated to such a degree as will destroy the oleaginous or volatile constituents thereof.

The paste formed in the manner above described constitutes the basis of the ink, which is then thinned to any desired degree with glycerine, for application to the ribbon, or to the pad of the stamping device. For a writing-ink, water is added until the paste is brought to the proper fluidity for use with the pen, glycerine, gum-arabic, or any other soluble and well-known material being added to prevent the ink from dropping from the pen.

If desired, an aniline or other coloring-matter may be used to modify the absolute black color of the ink.

The paste may also be molded into sticks, to be subsequently rubbed up with water for purposes to which the costly india-ink is generally applied.

The carbon will remain in the ink in a perfect state of suspension; hence all liability of its precipitation is obviated, and by using it in a calcined state it is more thoroughly dissolved than if oily particles existed therein. The absence of the latter will also tend to prevent the pan from clogging or "gumming" and cause it to flow more freely.

Asphaltum has heretofore been used as an ink by dissolving it in spirits of turpentine; but to my knowledge it has never been combined with a carbon and an alkaline solution. When asphaltum is used in the manner described by me it is thoroughly assimilated with the other ingredients, and gives to the ink the property of permeating the body or texture of the paper in such a manner or to such a degree as to make the writing or stamped matter absolutely indelible. It will be obvious that the tendency of the asphaltum is to harden or dry quickly on the paper, and another of its characteristics is to form glossy or sharp-cut lines of a crust-like nature.

Having thus described my invention, what I claim as new, and desire to secure by Letters Patent, is—

A base for writing or canceling inks, consisting of lamp-black, caustic alkali, and asphaltum, substantially as herein set forth.

In testimony whereof I affix my signature in presence of two witnesses.

HENRY FROEHLING.

Witnesses:
GEO. MCCAFFRAY,
I. H. AULL.